United States Patent [19]

Park

[11] Patent Number: 5,903,527
[45] Date of Patent: May 11, 1999

[54] METHOD OF DETERMINING A LOADING STATUS OF A DISK ON A ROUND ROULETTE

[75] Inventor: Dong-Kyun Park, Seoul, Rep. of Korea

[73] Assignee: Daewoo Electronics Co., Ltd., Seoul, Rep. of Korea

[21] Appl. No.: 08/969,337

[22] Filed: Nov. 28, 1997

[30] Foreign Application Priority Data

Nov. 28, 1996 [KR] Rep. of Korea ................. 96-59077

[51] Int. Cl.⁶ ............................................. G11B 17/22
[52] U.S. Cl. ............................................. 369/33; 369/37
[58] Field of Search ................................ 369/33, 34, 36, 369/37, 38, 39, 40, 178

[56] References Cited

U.S. PATENT DOCUMENTS

| | | |
|---|---|---|
| 5,115,419 | 5/1992 | Akiyama et al. . |
| 5,270,989 | 12/1993 | Kimura . |
| 5,293,362 | 3/1994 | Sakurai et al. . |
| 5,631,884 | 5/1997 | Chun . |
| 5,740,135 | 4/1998 | Nakagawa et al. ............... 369/34 |
| 5,802,022 | 9/1998 | Kim et al. .......................... 369/37 |

FOREIGN PATENT DOCUMENTS

| | | |
|---|---|---|
| 0639832 | 2/1995 | European Pat. Off. . |
| 4121297 | 1/1992 | Germany . |
| 63-061461 | 3/1988 | Japan . |
| 08212662 | 8/1996 | Japan . |
| 2276755 | 10/1994 | United Kingdom . |

*Primary Examiner*—Tan Dinh
*Attorney, Agent, or Firm*—Anderson, Kill & Olick, P.C.

[57] ABSTRACT

A method for determining a loading status of a disk on a round roulette utilizes a pulse signal to control the position of the round roulette. In the method, the pulse signal includes start/end codes, a first and a second identification pulse(ID-1, ID-2) and a disk loading detection pulse (DLDP), wherein the start/stop codes, the ID-1 and ID-2 is used for controlling the position of the round roulette and the DLDP is used for detecting the disk loade on the round roulette. In the inventive disk changer includes a function for detecting whether a disk is adequately loaded on a specific receiving plane of the round roulette or not. This is achieved by comparing a first time period between the falling edge time of an ID-1 and the rising edge time of a DLDP with a second time period between the falling edge time of the DLDP and the rising edge time of an ID-2, thereby allowing the disk changer to check an adequate loading of the disk on a round roulette.

7 Claims, 8 Drawing Sheets

METHOD OF DETERMINING A LOADING STATUS OF A DISK ON A ROUND ROULETTE

FIELD OF THE INVENTION

The present invention relates to a method for controlling a position of a round roulette incorporated in a disk changer; and, more particularly, to a method for determining a loading status of a disk on a round roulette by using a pulse signal to control the position of the round roulette.

DESCRIPTION OF THE PRIOR ART

As is well known, main difficulties associated with a compact disk player for reproducing a single disk, e.g., a digital audio disk or a compact disk, are caused due to the shortage of information recording area of the single disk. In some applications such as recording a motion picture film, the amount of data, e.g., a whole volume of data of the motion picture film, is too large to be stored on a single disk and therefore, the data has to be divided to be recorded onto several disks. A roulette-type disk changer employed to load a plurality of disks on a round roulette incorporated therein for reproducing the data off the plurality of disks sequentially or selectively in response to a user's instructions has been introduced to solve the problem.

In FIGS. 1 and 2, there is shown a prior art roulette-type disk changer 100 capable of loading three disks at a time, as disclosed in U.S. Pat. No. 5,631,884, entitled "COMPACT-DISC CHANGER USING THE SAME OPTICAL PICKUP DEVICE USED FOR PLAYING DISC FOR SENSING ROULETTE POSITION", which is incorporated herein by reference. The disk changer 100 includes a tray 164, an L-shaped holder chuck 160 having a fixing member 168 and a horizontal member 162, a reflection plate 190 formed at a bottom of the horizontal member 162, a round roulette 140 having throughhole groups for loading a plurality of disks, and a pickup portion 170 having a deck 178, a turn table 174, a motor 176, a sensor switch 172 and an optical pickup 171 for generating a laser beam.

In the disk changer 100, when the round roulette 140 rotates, the deck 178 descends vertically while the optical pickup 171 moves toward the outer circumference of the deck 178 to align with a throughhole 166 of the tray 164. When the optical pickup 171 reaches a proper position, the sensor switch 172 sends a detection signal to a control unit(not shown) which stops the movement of the optical pickup 171 and sets the laser beam focusing lens installed therein to a neutral position so that the emitted laser beam can be used in detecting the throughhole groups 121 to 123 and 110.

In this case, whenever a throughhole in the throughhole groups 121 to 123 and 110 of the round roulette 140 is aligned with the throughhole 166 in the tray 164, the emitted laser beam travels to the reflection plate 190 by passing through the throughhole 166 in the tray 164 and the throughhole groups 121 to 123 and 110 of the round roulette 140 and is interrupted by portions of the round roulette 140 which surround the throughhole groups 121 to 123 and 110. And then, the reflected laser beam from the reflection plate 190 impinges onto a sensor(not shown) incorporated in the optical pickup 171 to generate a pulse signal which can be decoded and used to determine the disk number.

In a similar manner, the pulse signal can be used to determine the exact position for stopping the round roulette 140. Here, the passage and interruption of the laser beam determined by the formation of the roulette-stop-sensing throughholes 110 at predetermined locations around the round roulette 140 signify proper roulette stopping positions. Once the round roulette 140 is stopped at an exact position, the deck 178 ascends vertically and the optical pickup 171 is moved back in order to execute a normal operation for disk playback.

One of the major shortcomings of the above-described disk changer 100 is that it cannot check whether or not a disk is actually loaded on the round roulette 140 adequately.

SUMMARY OF THE INVENTION

It is, therefore, a primary object of the present invention to provide a method for determining a loading status of a disk on a round roulette by using a pulse signal to control the position of the round roulette.

In accordance with the present invention, there is provided a method for determining a loading status of a disk on a round roulette by using a signal to control a position of the round roulette, the method comprising the steps of: (a) generating the signal including a first and a second identification pulses for controlling a position of the roulette and a disk loading detection pulse located between the identification pulses; (b) calculating a first time period between a falling edge of the first identification pulse and a rising edge of the disk loading detection pulse; (c) computing a second time period between the falling edge of the disk loading detection signal and a rising edge of the second identification pulse; and (d) stopping a rotation of the roulette if a difference value between the first and the second time periods is larger than a predetermined threshold.

BRIEF DESCRIPTION OF THE DRAWINGS

The present invention together with the above and other objects and advantages will become apparent from the following description of preferred embodiments, when read in conjunction with the accompanying drawings, wherein.

DETAILED DESCRIPTION OF THE PREFERRED EMBODIMENTS

Figure 1:
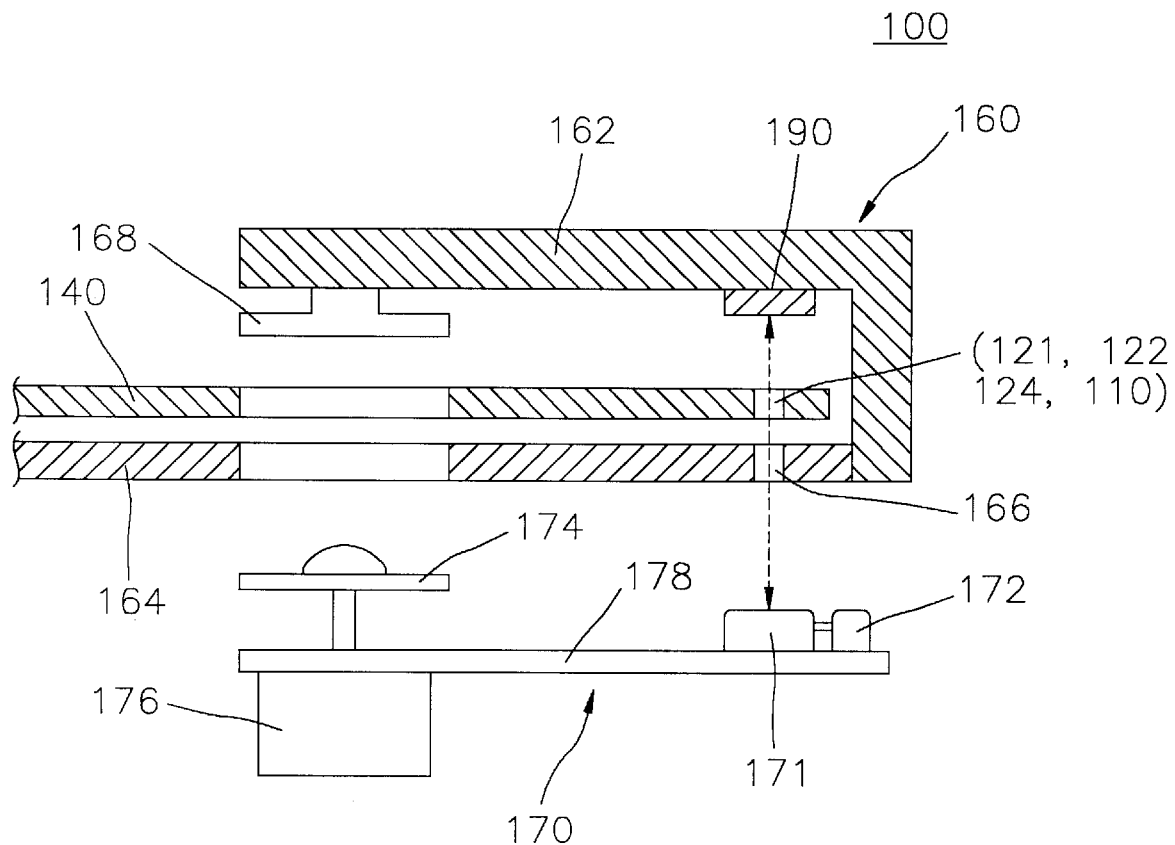
FIG. 1 represents a schematic cross-sectional view of a prior art roulette-type disk changer.
Figure 2:
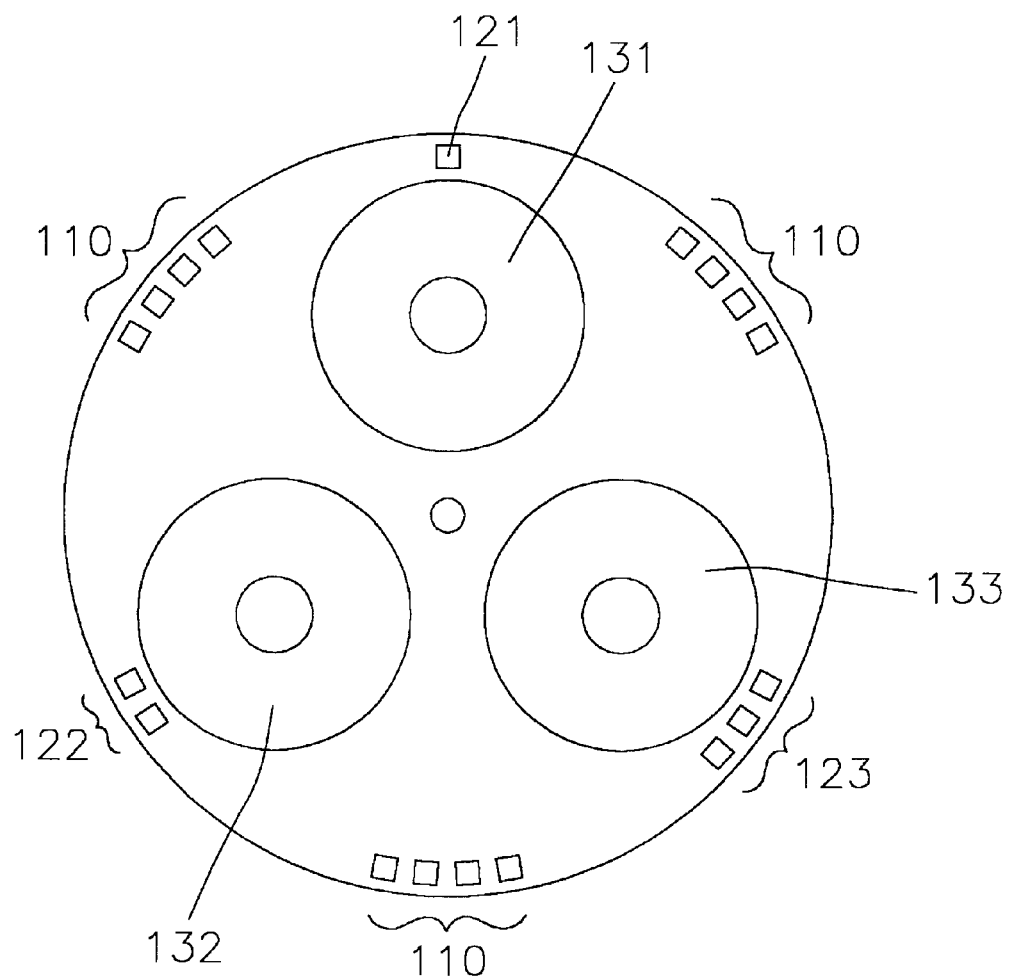
FIG. 2 is a plan view of a round roulette in the roulette-type disk changer shown in FIG. 1.
Figure 3:
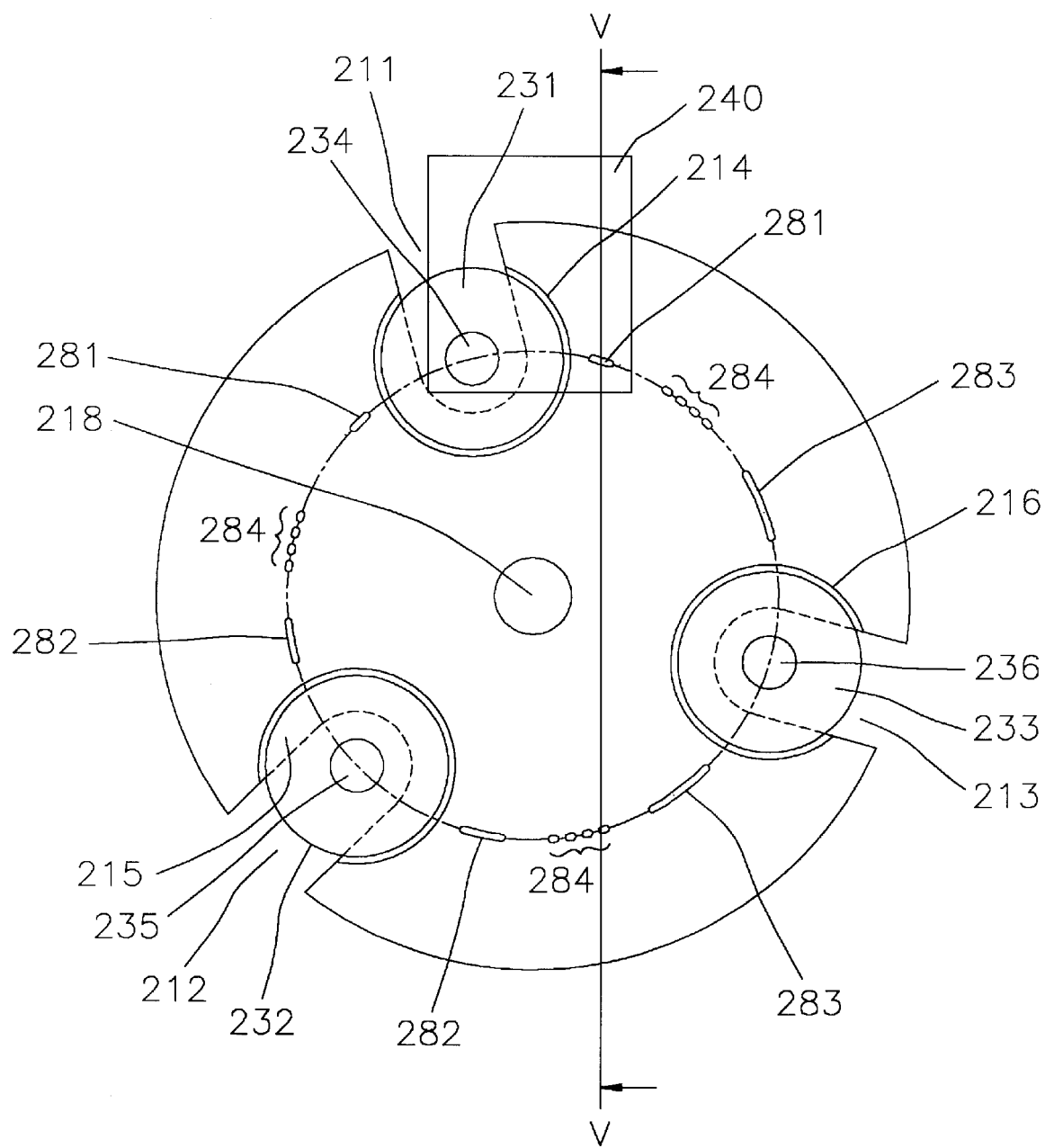
FIG. 3 shows a plan view of a round roulette in accordance with the present invention.

There is illustrated in FIG. 3 a plan view of an inventive round roulette 210 for use in a disk changer 200 in accordance with a preferred embodiment of the present invention, capable of loading three disks 231 to 233 thereon, wherein each of the disks 231 and 233 has a center hole 234 to 236, respectively. The round roulette 210 installed on a rotary shaft 218 comprises three receiving planes 214 to 216, an identification number being assigned to each of them, three sets 281 to 283 of identification throughholes for detecting the identification number and three sets 284 of start/stop throughholes for use in controlling the start and halt of the round roulette 210, wherein each start/stop throughhole sets 284 is equally spaced from each other, each being located between two of the identification throughhole sets 281 to 283. Each of the receiving planes 214 to 216 to hold a corresponding one of the disks 231 to 233 thereon has an elongated hole for allowing an optical pickup(not shown) to scan through the recording area of the corresponding one of the disks 231 to 233 during disk playback. The throughholes in the identification throughhole sets 281 to 283 are formed in a predetermined pattern along a circular path passing through the center holes 232 for sensing the identification number and a stop position of the round roulette 210, wherein the elongated holes 211 to 213 and the center holes 234 to 236 of the disks 231 to 233 are used for generating a disk loading detection pulse(DLDP), shown in FIGS. 5A and 5B. The width of the elongated hole is larger than a diameter of the center hole of the disk, thereby allowing the sensor, shown in FIG. 4, to generate a DLDP. It is preferable that the circular path passes through centers of the center holes 234 to 236 of the disks 231 to 233, wherein the circular path is indicated by a dashed-dot line in FIG. 3. Each of the throughholes in the identification throughhole sets 281 to 283 and the start/stop throughhole sets 284 extends from an upper surface to a lower surface of the round roulette 210. Since each of the identification throughhole sets 281 to 283 has a pair of throughholes and the throughholes on the circular path are formed symmetrically, the direction, e.g., clockwise or counterclockwise, of the round roulette 210 makes no difference for controlling the position of the round roulette 210.

Figure 4:
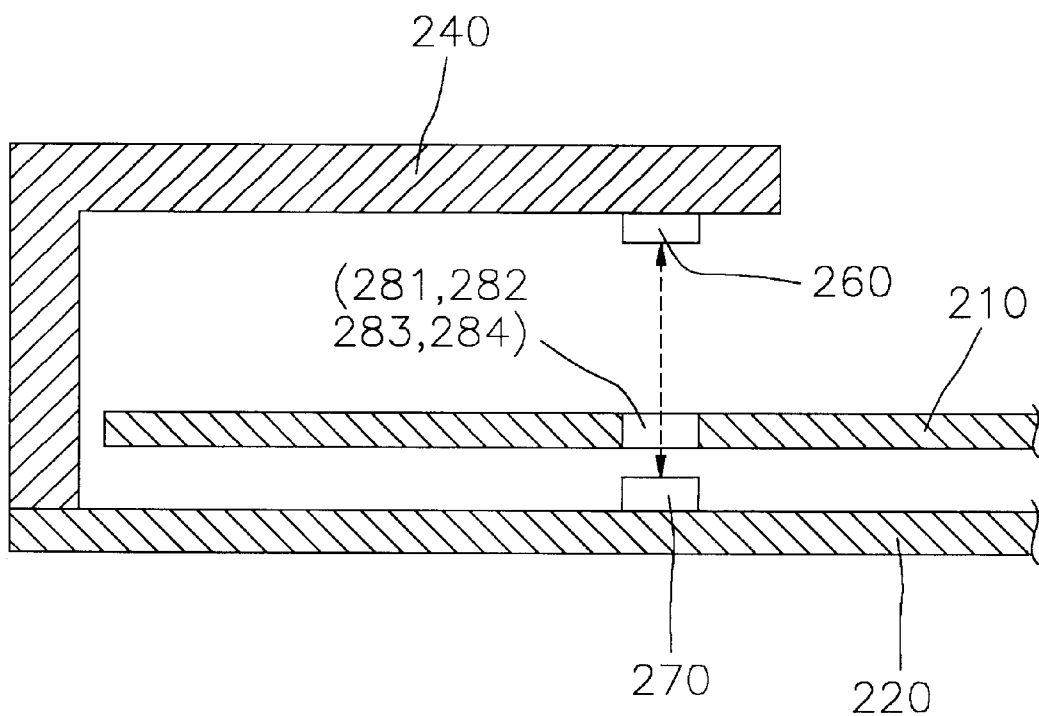
FIG. 4 depicts a schematic cross-sectional view of the a disk changer utilizing the inventive round roulette taken along the line V—V shown in FIG. 3.

As shown in FIG. 4, the disk changer 200 incorporating the inventive round roulette 210 includes an L-shaped holder chuck 240, a light source 260, attached to a bottom surface of the L-shaped holder chuck 240, for generating a light beam, a tray 220 for supporting the round roulette 210 and a photo sensor 270, mounted on top of the tray 220, for detecting the light beam.

In the disk changer 200, if a certain key in a key matrix panel is pressed to select a specific disk, an identification throughhole set corresponding to the specific disk, among the three identification throughhole sets 281 to 283, is detected by scanning through the identification throughhole sets 281 to 283 and the start/stop throughhole sets 284 on the circular path by using the light beam and the photo sensor 270. Thereafter, the receiving portion 214 loaded with the specific disk is stopped at a position of the optical pickup in response to a stopping signal generated by the photo sensor 270 in cooperation with the start/stop throughhole sets 284.

Figure 5A:
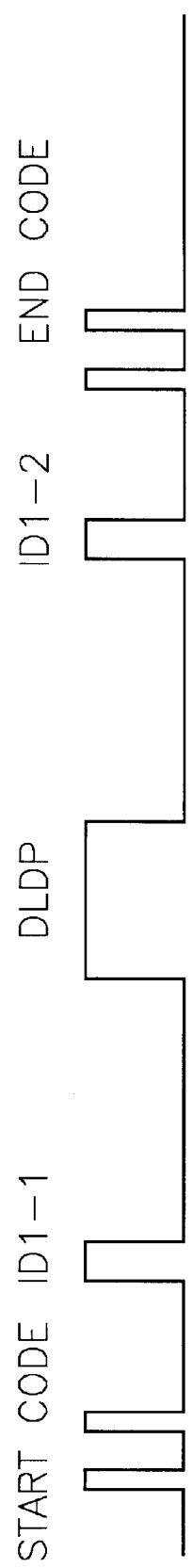
FIGS. 5A and 5B are the waveforms of the pulse signal generated by the photo sensor shown in FIG. 4.

As shown in FIG. 5A, when the round roulette 210 rotates, if the light beam scans through the receiving plane 214 when no disk is loaded thereon, the photo sensor 270 generates a pulse signal that includes a start and an end codes, a first and a second identification pulses(ID1-I, ID1-II) and a DLDP, wherein the pulse width of the DLDP depends on the circular path length spanned across the elongated hole 211.

Figure 5B:
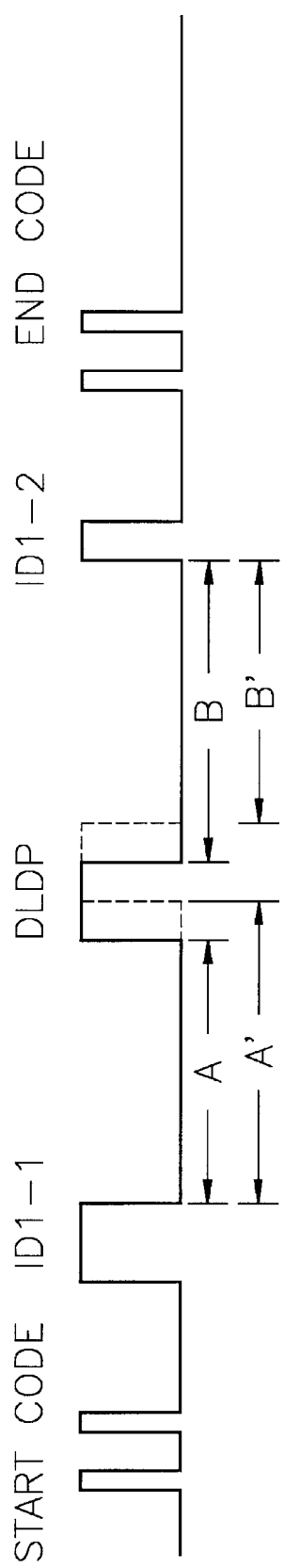

Shown in FIG. 5B, if the light beam scans through the receiving plane 214 when the disk 231 is loaded thereon, the photo sensor 270 generates a pulse signal, wherein the pulse width of the DLDP depends on the circular path length spanned across the center hole 234. The solid line represents the pulse signal when the disk 231 is adequately loaded on the receiving plane 214 of the round roulette 210, and the dotted lines shown in FIG. 5B represents the DLDP when the disk 231 is not adequately loaded on the receiving plane 214. The reference characters A and A' illustrate first time periods between a falling edge of the ID1-I and a rising edge of the DLDP, and the reference characters B and B' represent second time periods between a falling edge of the DLDP and a rising edge of the ID1-II.

Figure 6:
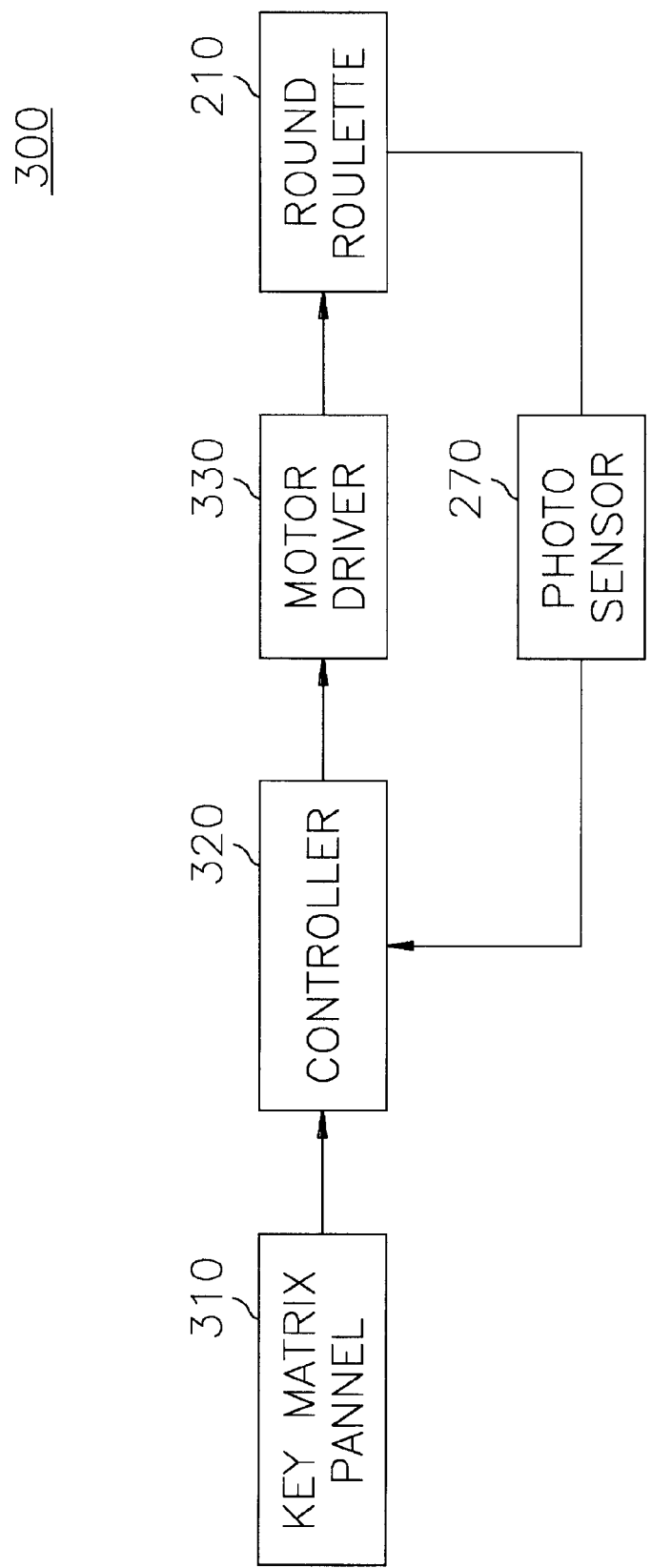
FIG. 6 describes a schematic block diagram of the inventive roulette controller.

Turning to FIG. 6, there is illustrated a block diagram of an inventive disk changer 300. The disk changer 300 comprises a key matrix panel 310, a controller 320, a motor driver 330, a round roulette 210 and a photo sensor 270. The controller 320 receives a control signal from the key matrix panel 310, and then sends a signal to the motor driver 330 for starting to rotate the round roulette 210. When the motor driver 330 rotates the round roulette 210, the photo sensor 270 generates a pulse signal in response to the throughholes of the round roulette 210. The photo sensor 270 supplies the controller 320 with the pulse signal for controlling the position of the round roulette 210 and for checking a loading status of a disk on the round roulette 210, wherein the loading status indicates whether or not the disk loading is adequate.

Figure 7A:
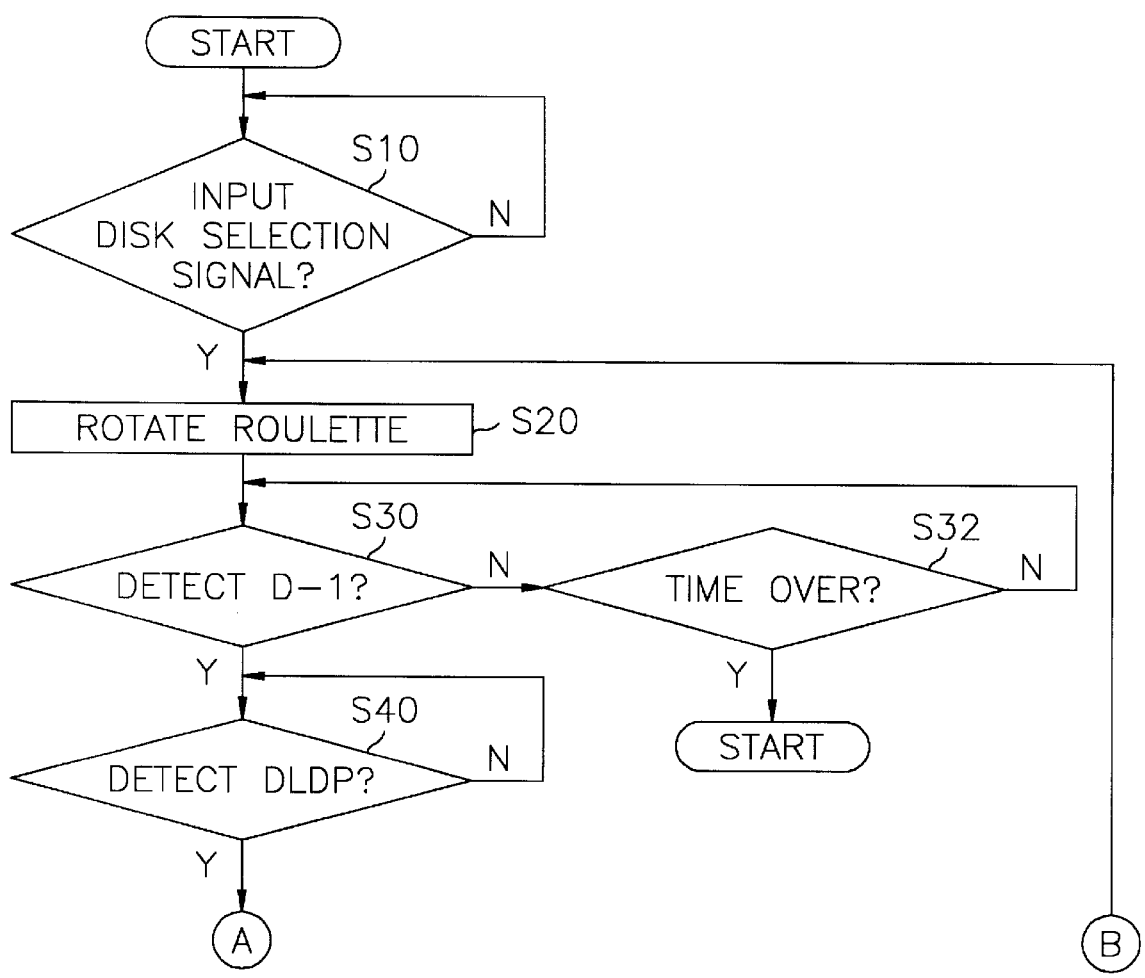
FIGS. 7A and 7B present a flow chart illustrating the procedure for checking an adequate loading of a disk on the round roulette by using the pulse signal generated by the photo sensor shown in FIG. 4.
Figure 7B:
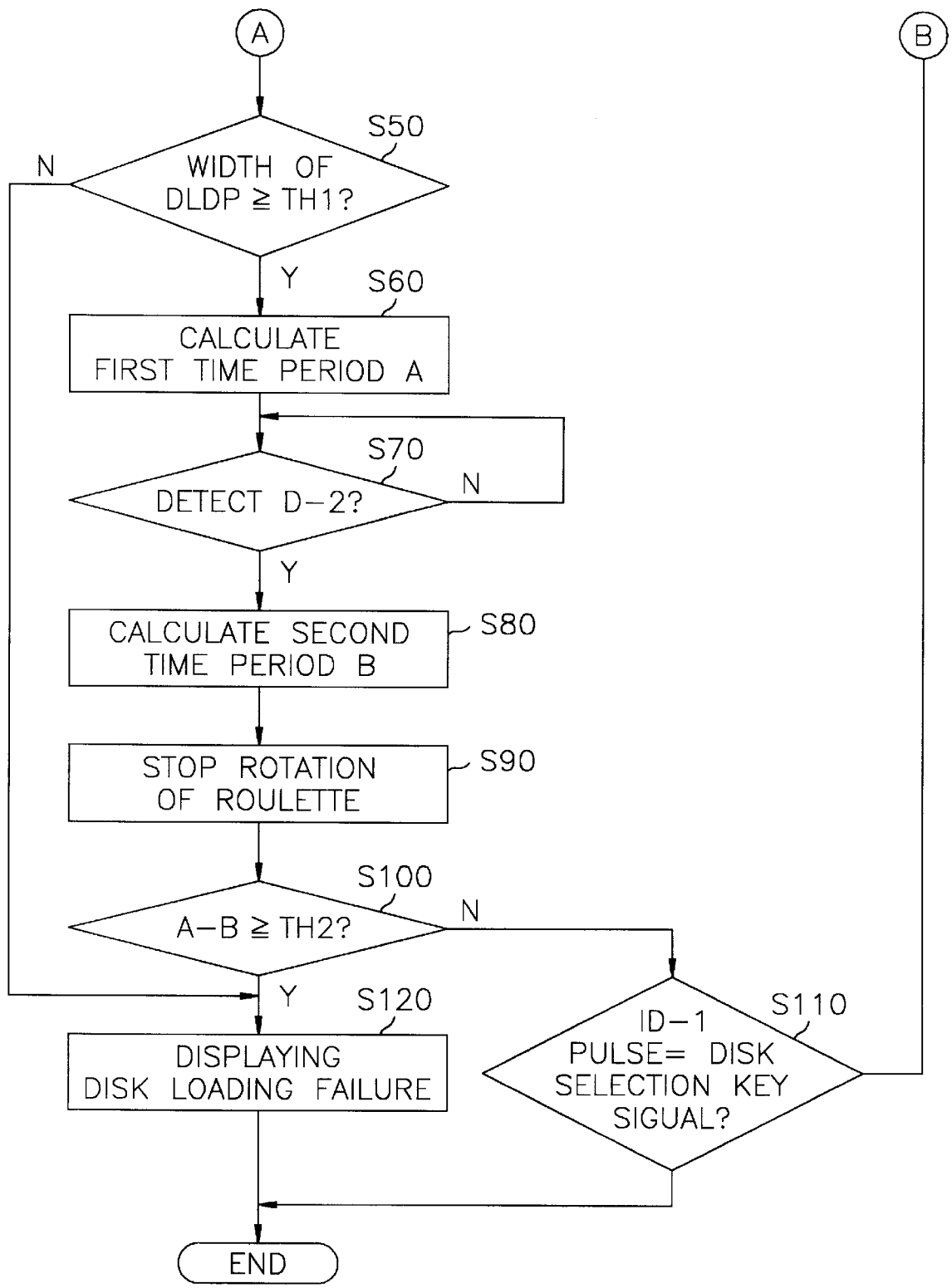

With reference to FIGS. 7A and 7B, the method for checking the loading status of a disk on the round roulette 210 in accordance with the present invention will now be described in detail. When a user pushes a disk selection key to generate a disk selection signal to select a disk to be played, the inventive checking process starts at step S10, wherein the disk selection key is selected in a key matrix panel 310. Once the disk selection signal is inputted from the key matrix panel 310, the process goes to step S20; and if not, the step S10 keeps repeating the receiving operation until the disk selection signal is received.

At step S20, the motor driver 330 starts to rotate the round roulette 210 upon receiving the disk selection signal, wherein the disk selection signal has an information on a receiving plane of the round roulette 210 on which the selected disk is loaded. If an ID-1 is not detected at step S30, the process goes to step S32. At step S32, the controller 320 checks whether a preset time is over or not, and if the checked result is NO, the process returns to step S30 where the controller 320 checks again whether the ID-1 is detected. If the checked result is YES, i.e., the waited time has reached the preset time at step S32, the whole ID-1 detecting process is terminated.

However, if the ID-1 is checked at step S30, then the process goes to step S40. At step S40, if a DLDP is detected, the process goes to step S50. If the DLDP is not detected at Step S40, the step S40 keeps repeating the receiving operation until the DLDP is received. At step S50, the width of the DLDP is checked whether or not the width thereof is equal to or greater than a first predetermined threshold (TH1). If the width of the DLDP is greater than TH1, the process goes to step S60, and if not, goes to step S120 for displaying a disk loading failure on the key matrix panel 310. It should be noted that the TH1 is smaller than the pulse width of the DLDP generated for scanning across the diameter of the center hole of the disk.

At step S60, a first time period(A) is calculated by subtracting a rising edge time of the DLDP from a falling edge time of the ID-1. And then, at a following step S70, if an ID-2 is detected, the process goes to step S80, and if not, the ID-2 detecting process repeats again. At step S80, a second time period(B) is calculated by subtracting a rising edge time of the ID-2 from a falling edge time of the DLDP. At a following step S90, the controller 320 halts the rotation of the round roulette 210, and substracts A from B, and compares the absolute value of the substraction A from B with a second predetermined value(TH2) at step S100. If the absolute value is larger than the TH2, the process goes to step S120, and if not, the process goes to step S120. At an ensuing step S110, the controller 320 checks whether or not the ID-1 matches with the disk selection signal. If the ID-1 matches with the disk selection signal, the controller 320 ends the whole process for playback disk.

At the step S120, the controller 320 displays a disk loading failure on the key matrix panel 310, and opens the tray 220.

In comparison with the prior art disk changer 100, the inventive disk changer further includes a function for detecting whether a disk is actually loaded adequately on a specific receiving plane of the round roulette 210 or not. This is achieved by comparing a first time period(A) between the falling edge time of an ID-1 and the rising edge time of a DLDP with a second time period(B) between the falling edge time of the DLDP and the rising edge time of an ID-2 in a pulse signal for controlling the position of the round roulette 210, thereby allowing the disk changer to check a loading staus of the disk on a round roulette 210 by using the pulse signal.

While the present invention has been described with respect to the preferred embodiments, other modifications and variations may be made without departing from the spirit and scope of the present invention as set forth in the following claims.

What is claimed is:

1. A method for determining a loading status of a disk on a round roulette by using a signal to control a position of the round roulette, the method comprising the steps of:

(a) generating the signal including a first and a second identification pulses for controlling a position of the roulette and a disk loading detection pulse between the identification pulses;

(b) calculating a first time period between a falling edge of the first identification pulse and a rising edge of the disk loading detection pulse;

(c) computing a second time period between a falling edge of the disk loading detection signal and a rising edge of the second identification pulse; and (d) stopping a rotation of the roulette if a difference between the first and the second time periods is larger than a predetermined threshold.

2. The method according to claim 1, further comprising, after said step (d) the step of:

(e) displaying a disk loading failure.

3. The method according to claim 2, further comprising, between said steps (a) and (b) the step of:

(a1) comparing a width of the disk loading detection pulse with a preset threshold, wherein if the width of the disk loading detection pulse is equal to or larger than the preset threshold value, the process proceeds to a following step, and if otherwise, the rotation of the roulette is terminated and indicates a disk loading failure.

4. The method according to claim 3, wherein the preset threshold is smaller than a pulse width generated when scanning across a diameter of a center hole of the disk.

5. The method according to claim 1, wherein the signal further includes a start and an end codes for controlling the start and the halt of the roulette.

6. A method for determining a loading status of a disk on a round roulette by using a signal to control a position of the round roulette, the disk having a center hole, the method comprising the steps of:

(a) generating the signal including a disk loading detection pulse;

(b) comparing a width of a disk loading detection pulse with a predetermined threshold, wherein the predetermined threshold is smaller than a pulse width generated when scanning across a diameter of the center hole of the disk; and (c) stopping a rotation of the roulette if the width is smaller than a predetermined threshold.

7. The method according to claim 6, further comprising, after said step (c) the step of:

(d) displaying a disk loading failure.

* * * * *